(12) United States Patent
Lavoie et al.

(10) Patent No.: US 10,384,607 B2
(45) Date of Patent: Aug. 20, 2019

(54) TRAILER BACKUP ASSIST SYSTEM WITH HITCH ANGLE OFFSET ESTIMATION

(71) Applicant: Ford Global Technologies, LLC, Dearborn, MI (US)

(72) Inventors: Erick Michael Lavoie, Dearborn, MI (US); Donald Jacob Mattern, Canton, MI (US); Joseph M. Raad, Farmington, MI (US); Tyler Daavettila, Howell, MI (US); Robert Bell, New Hudson, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 160 days.

(21) Appl. No.: 15/296,638

(22) Filed: Oct. 18, 2016

(65) Prior Publication Data

US 2017/0106796 A1  Apr. 20, 2017

Related U.S. Application Data

(60) Provisional application No. 62/243,403, filed on Oct. 19, 2015.

(51) Int. Cl.
 *B60R 1/00* (2006.01)
 *G01B 11/27* (2006.01)

(52) U.S. Cl.
 CPC .............. *B60R 1/00* (2013.01); *G01B 11/272* (2013.01); *B60R 2300/207* (2013.01); *B60R 2300/302* (2013.01); *B60R 2300/8086* (2013.01)

(58) Field of Classification Search
 None
 See application file for complete search history.

(56) References Cited

U.S. PATENT DOCUMENTS

| | | |
|---|---|---|
| 3,542,390 A | 11/1970 | Fikes et al. |
| 3,605,088 A | 9/1971 | Savelli |
| 3,787,077 A | 1/1974 | Sanders |
| 3,833,928 A | 9/1974 | Gavit et al. |
| 3,860,257 A | 1/1975 | Mesly |
| 4,040,006 A | 8/1977 | Kimmel |
| 4,042,132 A | 8/1977 | Bohman et al. |
| 4,122,390 A | 10/1978 | Kollitz et al. |
| 4,212,483 A | 7/1980 | Howard |

(Continued)

FOREIGN PATENT DOCUMENTS

| | | |
|---|---|---|
| CN | 102582686 B | 9/2013 |
| DE | 3923676 A1 | 1/1991 |

(Continued)

OTHER PUBLICATIONS

"Ford Super Duty: Truck Technologies", Brochure, Sep. 2011, 2 pages.

(Continued)

*Primary Examiner* — James M Anderson, II
(74) *Attorney, Agent, or Firm* — Raymond Coppiellie; Price Heneveld LLP (57) ABSTRACT

A system for estimating hitch angle offset is provided herein. A sensor system is configured to measure hitch angles between a vehicle and a trailer attached thereto. A controller is configured to calculate hitch angle offsets for a plurality of measured hitch angles, and extrapolate additional hitch angle offsets based on the calculated hitch angle offsets.

20 Claims, 7 Drawing Sheets

(56) References Cited

U.S. PATENT DOCUMENTS

| | | |
|---|---|---|
| 4,366,966 A | 1/1983 | Ratsko et al. |
| 4,727,419 A | 2/1988 | Yamada et al. |
| 4,735,432 A | 4/1988 | Brown |
| 4,752,080 A | 6/1988 | Rogers |
| 4,778,060 A | 10/1988 | Wessner, Jr. |
| 4,848,449 A | 7/1989 | Martinet et al. |
| 4,852,901 A | 8/1989 | Beasley et al. |
| 4,943,080 A | 7/1990 | Reimer |
| 5,001,639 A | 3/1991 | Breen |
| 5,056,905 A | 10/1991 | Jensen |
| 5,097,250 A | 3/1992 | Hernandez |
| 5,108,123 A | 4/1992 | Rubenzik |
| 5,108,158 A | 4/1992 | Breen |
| 5,132,851 A | 7/1992 | Bomar et al. |
| 5,152,544 A | 10/1992 | Dierker, Jr. et al. |
| 5,191,328 A | 3/1993 | Nelson |
| 5,244,226 A | 9/1993 | Bergh |
| 5,246,242 A | 9/1993 | Penzotti |
| 5,247,442 A | 9/1993 | Kendall |
| 5,282,641 A | 2/1994 | McLaughlin |
| 5,289,892 A | 3/1994 | Notsu |
| 5,290,057 A | 3/1994 | Pellerito |
| 5,455,557 A | 10/1995 | Noll et al. |
| 5,521,633 A | 5/1996 | Nakajima et al. |
| 5,523,947 A | 6/1996 | Breen |
| 5,541,778 A | 7/1996 | DeFlorio |
| 5,558,350 A | 9/1996 | Kimbrough et al. |
| 5,559,696 A | 9/1996 | Borenstein |
| 5,579,228 A | 11/1996 | Kimbrough et al. |
| 5,631,656 A | 5/1997 | Hartman et al. |
| 5,650,764 A | 7/1997 | McCullough |
| 5,690,347 A | 11/1997 | Juergens et al. |
| 5,719,713 A | 2/1998 | Brown |
| 5,747,683 A | 5/1998 | Gerum et al. |
| 5,821,852 A | 10/1998 | Fairchild |
| 5,980,048 A | 11/1999 | Rannells, Jr. et al. |
| 6,041,582 A | 3/2000 | Tiede et al. |
| 6,042,196 A | 3/2000 | Nakamura et al. |
| 6,124,709 A | 9/2000 | Allwine |
| 6,151,175 A | 11/2000 | Osha |
| 6,198,992 B1 | 3/2001 | Winslow |
| 6,217,177 B1 | 4/2001 | Rost |
| 6,218,828 B1 | 4/2001 | Bates et al. |
| 6,223,104 B1 | 4/2001 | Kamen et al. |
| 6,223,114 B1 | 4/2001 | Boros et al. |
| 6,268,800 B1 | 7/2001 | Howard |
| 6,292,094 B1 | 9/2001 | Deng et al. |
| 6,301,548 B1 | 10/2001 | Gerum |
| 6,351,698 B1 | 2/2002 | Kubota et al. |
| 6,472,865 B1 | 10/2002 | Tola et al. |
| 6,480,104 B1 | 11/2002 | Wall et al. |
| 6,483,429 B1 | 11/2002 | Yasui et al. |
| 6,494,476 B2 | 12/2002 | Masters et al. |
| 6,498,977 B2 | 12/2002 | Wetzel et al. |
| 6,539,288 B2 | 3/2003 | Ishida et al. |
| 6,568,093 B2 | 5/2003 | Kogiso et al. |
| 6,577,952 B2 | 6/2003 | Geier et al. |
| 6,668,225 B2 | 12/2003 | Oh et al. |
| 6,704,653 B2 | 3/2004 | Kuriya et al. |
| 6,712,378 B1 | 3/2004 | Austin |
| 6,801,125 B1 | 10/2004 | McGregor et al. |
| 6,806,809 B2 | 10/2004 | Lee et al. |
| 6,820,888 B1 | 11/2004 | Griffin |
| 6,838,979 B2 | 1/2005 | Deng et al. |
| 6,854,557 B1 | 2/2005 | Deng et al. |
| 6,857,494 B2 | 2/2005 | Kobayashi et al. |
| 6,879,240 B2 | 4/2005 | Kruse |
| 6,956,468 B2 | 10/2005 | Lee et al. |
| 6,959,970 B2 | 11/2005 | Tseng |
| 6,999,856 B2 | 2/2006 | Lee et al. |
| 7,005,974 B2 | 2/2006 | McMahon et al. |
| 7,006,127 B2 | 2/2006 | Mizusawa et al. |
| 7,008,088 B2 | 3/2006 | Pisciotti |
| 7,028,804 B2 | 4/2006 | Eki et al. |
| 7,032,705 B2 | 4/2006 | Zheng et al. |
| 7,046,127 B2 | 5/2006 | Boddy |
| 7,058,493 B2 | 6/2006 | Inagaki |
| 7,089,101 B2 | 8/2006 | Fischer et al. |
| 7,154,385 B2 | 12/2006 | Lee et al. |
| 7,159,890 B2 | 1/2007 | Craig et al. |
| 7,167,785 B2 | 1/2007 | Lohberg et al. |
| 7,170,285 B2 | 1/2007 | Spratte |
| 7,171,330 B2 | 1/2007 | Kruse et al. |
| 7,204,504 B2 | 4/2007 | Gehring et al. |
| 7,219,913 B2 | 5/2007 | Atley |
| 7,225,891 B2 | 6/2007 | Gehring et al. |
| 7,229,139 B2 | 6/2007 | Lu et al. |
| 7,239,958 B2 | 7/2007 | Grougan et al. |
| 7,269,489 B2 | 9/2007 | Deng et al. |
| 7,272,481 B2 | 9/2007 | Einig et al. |
| 7,295,907 B2 | 11/2007 | Lu et al. |
| 7,401,871 B2 | 7/2008 | Lu et al. |
| 7,405,557 B2 | 7/2008 | Spratte et al. |
| 7,413,266 B2 | 8/2008 | Lenz et al. |
| 7,425,889 B2 | 9/2008 | Widmann et al. |
| 7,447,585 B2 | 11/2008 | Tandy, Jr. et al. |
| 7,451,020 B2 | 11/2008 | Goetting et al. |
| 7,463,137 B2 | 12/2008 | Wishart et al. |
| 7,504,995 B2 | 3/2009 | Lawrence et al. |
| 7,532,109 B2 | 5/2009 | Takahama et al. |
| 7,540,523 B2 | 6/2009 | Russell et al. |
| 7,548,155 B2 | 6/2009 | Schutt et al. |
| 7,568,716 B2 | 8/2009 | Dietz |
| 7,623,952 B2 | 11/2009 | Unruh et al. |
| 7,648,153 B2 | 1/2010 | Metternich et al. |
| 7,690,737 B2 | 4/2010 | Lu |
| 7,715,953 B2 | 5/2010 | Shepard |
| 7,731,302 B2 | 6/2010 | Tandy, Jr. et al. |
| 7,793,965 B2 | 9/2010 | Padula |
| 7,798,263 B2 | 9/2010 | Tandy, Jr. et al. |
| 7,878,545 B2 | 2/2011 | Rhymer et al. |
| 7,904,222 B2 | 3/2011 | Lee et al. |
| 7,905,507 B2 | 3/2011 | Perri |
| 7,950,751 B2 | 5/2011 | Offerle et al. |
| 7,953,536 B2 | 5/2011 | Katrak |
| 7,974,444 B2 | 7/2011 | Hongo |
| 8,010,252 B2 | 8/2011 | Getman et al. |
| 8,010,253 B2 | 8/2011 | Lundquist |
| 8,036,792 B2 | 10/2011 | Dechamp |
| 8,038,166 B1 | 10/2011 | Piesinger |
| 8,044,779 B2 | 10/2011 | Hahn et al. |
| 8,073,594 B2 | 12/2011 | Lee et al. |
| 8,157,284 B1 | 4/2012 | McGhie et al. |
| 8,165,770 B2 | 4/2012 | Getman et al. |
| 8,167,444 B2 | 5/2012 | Lee et al. |
| 8,170,726 B2 | 5/2012 | Chen et al. |
| 8,174,576 B2 | 5/2012 | Akatsuka et al. |
| 8,180,543 B2 | 5/2012 | Futamura et al. |
| 8,190,364 B2 | 5/2012 | Rekow |
| 8,191,915 B2 | 6/2012 | Freese, V et al. |
| 8,192,036 B2 | 6/2012 | Lee et al. |
| 8,215,436 B2 | 7/2012 | DeGrave et al. |
| 8,223,204 B2 | 7/2012 | Hahn |
| 8,244,442 B2 | 8/2012 | Craig et al. |
| 8,260,518 B2 | 9/2012 | Englert |
| 8,267,485 B2 | 9/2012 | Barlsen et al. |
| 8,280,607 B2 | 10/2012 | Gatti et al. |
| 8,308,182 B2 | 11/2012 | Ortmann et al. |
| 8,326,504 B2 | 12/2012 | Wu et al. |
| 8,342,560 B2 | 1/2013 | Albers et al. |
| 8,380,390 B2 | 2/2013 | Sy et al. |
| 8,380,416 B2 | 2/2013 | Offerle et al. |
| 8,393,632 B2 | 3/2013 | Vortmeyer et al. |
| 8,401,744 B2 | 3/2013 | Chiocco |
| 8,427,288 B2 | 4/2013 | Schofield et al. |
| 8,469,125 B2 | 6/2013 | Yu et al. |
| 8,498,757 B2 | 7/2013 | Bowden et al. |
| 8,504,243 B2 | 8/2013 | Kageyama |
| 8,547,401 B2 | 10/2013 | Mallinson et al. |
| 8,548,680 B2 | 10/2013 | Ryerson et al. |
| 8,548,683 B2 | 10/2013 | Cebon et al. |
| 8,571,777 B2 | 10/2013 | Greene |
| 8,576,115 B2 | 11/2013 | Basten |
| 8,626,382 B2 | 1/2014 | Obradovich |

(56) References Cited

U.S. PATENT DOCUMENTS

| | | |
|---|---|---|
| 8,675,953 B1 | 3/2014 | Elwell et al. |
| 8,755,984 B2 | 6/2014 | Rupp et al. |
| 8,768,535 B2 | 7/2014 | Kossira et al. |
| 8,807,261 B2 | 8/2014 | Subrt et al. |
| 8,811,698 B2 | 8/2014 | Kono et al. |
| 8,825,328 B2 | 9/2014 | Rupp et al. |
| 8,833,789 B2 | 9/2014 | Anderson |
| 8,886,400 B2 | 11/2014 | Kossira et al. |
| 8,888,120 B2 | 11/2014 | Trevino |
| 8,909,426 B2 | 12/2014 | Rhode et al. |
| 8,930,140 B2 | 1/2015 | Trombley et al. |
| 8,939,462 B2 | 1/2015 | Adamczyk et al. |
| 8,955,865 B2 | 2/2015 | Fortin et al. |
| 8,972,109 B2 | 3/2015 | Lavoie et al. |
| 9,008,913 B1 | 4/2015 | Sears et al. |
| 9,026,311 B1 | 5/2015 | Pieronek et al. |
| 9,042,603 B2 | 5/2015 | Elwart et al. |
| 9,082,315 B2 | 7/2015 | Lin et al. |
| 9,102,271 B2 | 8/2015 | Trombley et al. |
| 9,108,598 B2 | 8/2015 | Headley |
| 9,114,832 B2 | 8/2015 | Wang et al. |
| 9,120,358 B2 | 9/2015 | Molls et al. |
| 9,120,359 B2 | 9/2015 | Chiu et al. |
| 9,132,856 B2 | 9/2015 | Shephard |
| 9,156,496 B2 | 10/2015 | Greenwood et al. |
| 9,164,955 B2 | 10/2015 | Lavoie et al. |
| 9,180,890 B2 | 11/2015 | Lu et al. |
| 9,187,124 B2 | 11/2015 | Trombley et al. |
| 9,227,474 B2 | 1/2016 | Liu |
| 9,238,483 B2 | 1/2016 | Hafner et al. |
| 9,248,858 B2 | 2/2016 | Lavoie et al. |
| 9,296,422 B2 | 3/2016 | Lavoie |
| 9,315,212 B1 | 4/2016 | Kyrtsos et al. |
| 9,321,483 B2 | 4/2016 | Headley |
| 9,335,162 B2 | 5/2016 | Kyrtsos et al. |
| 9,340,228 B2 | 5/2016 | Xu et al. |
| 9,352,777 B2 | 5/2016 | Lavoie et al. |
| 9,393,996 B2 | 7/2016 | Goswami et al. |
| 9,428,188 B2 | 8/2016 | Schwindt et al. |
| 9,434,414 B2 | 9/2016 | Lavoie |
| 9,500,497 B2 | 11/2016 | Lavoie |
| 9,610,974 B2 | 4/2017 | Herzog et al. |
| 9,616,923 B2 | 4/2017 | Lavoie |
| 9,623,904 B2 | 4/2017 | Lavoie et al. |
| 9,676,377 B2 | 6/2017 | Hafner et al. |
| 9,798,953 B2 | 10/2017 | Hu |
| 9,827,818 B2 | 11/2017 | Hu et al. |
| 9,836,060 B2 | 12/2017 | Ghneim et al. |
| 9,840,278 B2 | 12/2017 | Lavoie et al. |
| 10,046,800 B2 | 8/2018 | Hu et al. |
| 2001/0024333 A1 | 9/2001 | Rost |
| 2001/0037164 A1 | 11/2001 | Hecker |
| 2002/0128764 A1 | 9/2002 | Hecker et al. |
| 2004/0017285 A1 | 1/2004 | Zielinski et al. |
| 2004/0021291 A1 | 2/2004 | Haug et al. |
| 2004/0093139 A1 | 5/2004 | Wildey et al. |
| 2004/0130441 A1 | 7/2004 | Lee et al. |
| 2004/0222881 A1 | 11/2004 | Deng et al. |
| 2005/0000738 A1 | 1/2005 | Gehring et al. |
| 2005/0074143 A1 | 4/2005 | Kawai |
| 2005/0128059 A1 | 6/2005 | Vause |
| 2005/0206224 A1 | 9/2005 | Lu |
| 2005/0206225 A1 | 9/2005 | Offerle et al. |
| 2005/0206229 A1 | 9/2005 | Lu et al. |
| 2005/0206231 A1 | 9/2005 | Lu et al. |
| 2005/0236201 A1 | 10/2005 | Spannheimer et al. |
| 2005/0236896 A1 | 10/2005 | Offerle et al. |
| 2006/0041358 A1 | 2/2006 | Hara |
| 2006/0071447 A1 | 4/2006 | Gehring et al. |
| 2006/0076828 A1 | 4/2006 | Lu et al. |
| 2006/0103511 A1 | 5/2006 | Lee et al. |
| 2006/0111820 A1 | 5/2006 | Goetting et al. |
| 2006/0142936 A1 | 6/2006 | Dix |
| 2006/0155455 A1 | 7/2006 | Lucas et al. |
| 2006/0244579 A1 | 11/2006 | Raab |
| 2007/0027581 A1 | 2/2007 | Bauer et al. |
| 2007/0090688 A1 | 4/2007 | Haemmerling et al. |
| 2007/0132560 A1 | 6/2007 | Nystrom et al. |
| 2007/0152424 A1 | 7/2007 | Deng et al. |
| 2007/0285808 A1 | 12/2007 | Beale |
| 2008/0143593 A1 | 6/2008 | Graziano et al. |
| 2008/0147277 A1 | 6/2008 | Lu et al. |
| 2008/0231701 A1 | 9/2008 | Greenwood et al. |
| 2008/0312792 A1 | 12/2008 | Dechamp |
| 2009/0005932 A1 | 1/2009 | Lee et al. |
| 2009/0079828 A1 | 3/2009 | Lee et al. |
| 2009/0085775 A1 | 4/2009 | Otsuka et al. |
| 2009/0093928 A1 | 4/2009 | Getman et al. |
| 2009/0198425 A1 | 8/2009 | Englert |
| 2009/0228182 A1 | 9/2009 | Waldbauer et al. |
| 2009/0248346 A1 | 10/2009 | Fennel et al. |
| 2009/0280859 A1 | 11/2009 | Bergh |
| 2009/0300701 A1 | 12/2009 | Karaoguz et al. |
| 2009/0306861 A1 | 12/2009 | Schumann et al. |
| 2010/0063702 A1 | 3/2010 | Sabelstrom et al. |
| 2010/0171828 A1 | 7/2010 | Ishii |
| 2010/0272370 A1 | 10/2010 | Schilling et al. |
| 2010/0332049 A1 | 12/2010 | Sy et al. |
| 2011/0001825 A1 | 1/2011 | Hahn |
| 2011/0018231 A1 | 1/2011 | Collenberg |
| 2011/0022282 A1 | 1/2011 | Wu et al. |
| 2011/0087398 A1 | 4/2011 | Lu et al. |
| 2011/0112721 A1 | 5/2011 | Wang et al. |
| 2011/0125457 A1 | 5/2011 | Lee et al. |
| 2011/0160956 A1 | 6/2011 | Chung et al. |
| 2011/0181457 A1 | 7/2011 | Basten |
| 2011/0257860 A1 | 10/2011 | Getman et al. |
| 2012/0007982 A1* | 1/2012 | Giuffrida ............... G01C 11/02 348/144 |
| 2012/0041658 A1 | 2/2012 | Turner |
| 2012/0086808 A1 | 4/2012 | Lynam et al. |
| 2012/0095649 A1 | 4/2012 | Klier et al. |
| 2012/0109471 A1 | 5/2012 | Wu |
| 2012/0112434 A1 | 5/2012 | Albers et al. |
| 2012/0185131 A1 | 7/2012 | Headley |
| 2012/0200706 A1 | 8/2012 | Greenwood et al. |
| 2012/0221168 A1 | 8/2012 | Zeng et al. |
| 2012/0271512 A1 | 10/2012 | Rupp et al. |
| 2012/0271514 A1 | 10/2012 | Lavoie et al. |
| 2012/0271515 A1 | 10/2012 | Rhode et al. |
| 2012/0271522 A1 | 10/2012 | Rupp et al. |
| 2012/0283909 A1 | 11/2012 | Dix |
| 2012/0283910 A1 | 11/2012 | Lee et al. |
| 2012/0310594 A1 | 12/2012 | Watanabe |
| 2013/0006472 A1 | 1/2013 | McClain et al. |
| 2013/0024064 A1 | 1/2013 | Shepard |
| 2013/0027195 A1 | 1/2013 | Van Wiemeersch et al. |
| 2013/0082453 A1 | 4/2013 | Padula |
| 2013/0158863 A1 | 6/2013 | Skvarce et al. |
| 2013/0179038 A1 | 7/2013 | Goswami et al. |
| 2013/0207834 A1 | 8/2013 | Mizutani et al. |
| 2013/0226390 A1 | 8/2013 | Luo et al. |
| 2013/0250114 A1 | 9/2013 | Lu |
| 2013/0261843 A1 | 10/2013 | Kossira et al. |
| 2013/0268160 A1 | 10/2013 | Trombley et al. |
| 2013/0321347 A1 | 12/2013 | Kim |
| 2014/0005918 A1 | 1/2014 | Qiang |
| 2014/0012465 A1 | 1/2014 | Shank et al. |
| 2014/0025260 A1 | 1/2014 | McClure |
| 2014/0052337 A1 | 2/2014 | Lavoie et al. |
| 2014/0058614 A1 | 2/2014 | Trombley et al. |
| 2014/0058622 A1 | 2/2014 | Trombley et al. |
| 2014/0058655 A1 | 2/2014 | Trombley et al. |
| 2014/0058668 A1 | 2/2014 | Trombley et al. |
| 2014/0067154 A1 | 3/2014 | Yu et al. |
| 2014/0067155 A1 | 3/2014 | Yu et al. |
| 2014/0085472 A1 | 3/2014 | Lu et al. |
| 2014/0088824 A1 | 3/2014 | Ishimoto |
| 2014/0160276 A1 | 6/2014 | Pliefke et al. |
| 2014/0172232 A1 | 6/2014 | Rupp et al. |
| 2014/0183841 A1 | 7/2014 | Jones |
| 2014/0188344 A1 | 7/2014 | Lavoie |
| 2014/0188346 A1 | 7/2014 | Lavoie |
| 2014/0210456 A1 | 7/2014 | Crossman |

(56) References Cited

U.S. PATENT DOCUMENTS

| | | |
|---|---|---|
| 2014/0218506 A1 | 8/2014 | Trombley et al. |
| 2014/0218522 A1 | 8/2014 | Lavoie et al. |
| 2014/0222288 A1 | 8/2014 | Lavoie et al. |
| 2014/0236532 A1 | 8/2014 | Trombley et al. |
| 2014/0249691 A1 | 9/2014 | Hafner et al. |
| 2014/0267688 A1 | 9/2014 | Aich et al. |
| 2014/0267689 A1 | 9/2014 | Lavoie |
| 2014/0277941 A1 | 9/2014 | Chiu et al. |
| 2014/0277942 A1 | 9/2014 | Kyrtsos et al. |
| 2014/0297128 A1 | 10/2014 | Lavoie et al. |
| 2014/0297129 A1 | 10/2014 | Lavoie et al. |
| 2014/0303847 A1 | 10/2014 | Lavoie |
| 2014/0303849 A1* | 10/2014 | Hafner .............. B62D 13/06 701/42 |
| 2014/0309888 A1 | 10/2014 | Smit et al. |
| 2014/0324295 A1 | 10/2014 | Lavoie |
| 2014/0343795 A1 | 11/2014 | Lavoie |
| 2014/0358429 A1 | 12/2014 | Shutko et al. |
| 2014/0379217 A1 | 12/2014 | Rupp et al. |
| 2015/0002670 A1 | 1/2015 | Bajpai |
| 2015/0035256 A1 | 2/2015 | Klank et al. |
| 2015/0057903 A1 | 2/2015 | Rhode et al. |
| 2015/0066296 A1 | 3/2015 | Trombley et al. |
| 2015/0066298 A1 | 3/2015 | Sharma et al. |
| 2015/0105975 A1 | 4/2015 | Dunn |
| 2015/0115571 A1 | 4/2015 | Zhang et al. |
| 2015/0120141 A1 | 4/2015 | Lavoie et al. |
| 2015/0120143 A1 | 4/2015 | Schlichting |
| 2015/0134183 A1 | 5/2015 | Lavoie et al. |
| 2015/0138340 A1 | 5/2015 | Lavoie |
| 2015/0149040 A1 | 5/2015 | Hueger et al. |
| 2015/0158527 A1 | 6/2015 | Hafner et al. |
| 2015/0165850 A1 | 6/2015 | Chiu et al. |
| 2015/0197278 A1 | 7/2015 | Boos et al. |
| 2015/0203156 A1 | 7/2015 | Hafner et al. |
| 2015/0210254 A1 | 7/2015 | Pieronek et al. |
| 2015/0210317 A1 | 7/2015 | Hafner et al. |
| 2015/0217693 A1 | 8/2015 | Pliefke et al. |
| 2015/0269444 A1 | 9/2015 | Lameyre et al. |
| 2016/0001705 A1 | 1/2016 | Greenwood et al. |
| 2016/0009288 A1 | 1/2016 | Yu |
| 2016/0039456 A1 | 2/2016 | Lavoie et al. |
| 2016/0059780 A1 | 3/2016 | Lavoie |
| 2016/0059888 A1 | 3/2016 | Bradley et al. |
| 2016/0059889 A1 | 3/2016 | Herzog et al. |
| 2016/0096549 A1 | 4/2016 | Herzog et al. |
| 2016/0129939 A1 | 5/2016 | Singh et al. |
| 2016/0152263 A1 | 6/2016 | Singh et al. |
| 2016/0153778 A1 | 6/2016 | Singh et al. |
| 2016/0229452 A1 | 8/2016 | Lavoie et al. |
| 2016/0280267 A1 | 9/2016 | Lavoie et al. |
| 2017/0073005 A1 | 3/2017 | Ghneim et al. |
| 2017/0101130 A1 | 4/2017 | Lavoie |
| 2017/0106796 A1 | 4/2017 | Lavoie et al. |
| 2017/0174130 A1 | 6/2017 | Hu et al. |
| 2017/0177949 A1 | 6/2017 | Hu et al. |
| 2017/0297619 A1 | 10/2017 | Lavoie et al. |
| 2017/0297620 A1 | 10/2017 | Lavoie et al. |
| 2017/0313351 A1 | 11/2017 | Lavoie |

FOREIGN PATENT DOCUMENTS

| | | |
|---|---|---|
| DE | 3931518 A1 | 4/1991 |
| DE | 9208595 U1 | 8/1992 |
| DE | 19526702 A1 | 2/1997 |
| DE | 10030738 C1 | 8/2001 |
| DE | 10031244 A1 | 1/2002 |
| DE | 10065230 A1 | 7/2002 |
| DE | 10122562 C1 | 7/2002 |
| DE | 10154612 A1 | 5/2003 |
| DE | 10312548 B3 | 5/2004 |
| DE | 10333998 A1 | 2/2005 |
| DE | 102004050149 A1 | 4/2006 |
| DE | 102005042957 A1 | 3/2007 |
| DE | 102005043466 A1 | 3/2007 |
| DE | 102005043467 A1 | 3/2007 |
| DE | 102005043468 A1 | 3/2007 |
| DE | 102006002294 A1 | 7/2007 |
| DE | 102006048947 A1 | 4/2008 |
| DE | 102006056408 A1 | 6/2008 |
| DE | 102008020838 A1 | 11/2008 |
| DE | 102007029413 A1 | 1/2009 |
| DE | 102008045436 A1 | 3/2010 |
| DE | 102006035021 | 4/2010 |
| DE | 102006035021 B4 | 4/2010 |
| DE | 102008043675 A1 | 5/2010 |
| DE | 102009007990 A1 | 8/2010 |
| DE | 102009012253 A1 | 9/2010 |
| DE | 102009027041 A1 | 12/2010 |
| DE | 102009038552 A1 | 2/2011 |
| DE | 102010006323 A1 | 8/2011 |
| DE | 102008004158 B4 | 10/2011 |
| DE | 102008004159 B4 | 10/2011 |
| DE | 102008004160 B4 | 10/2011 |
| DE | 102010021052 A1 | 11/2011 |
| DE | 102010029184 A1 | 11/2011 |
| DE | 102010045519 A1 | 3/2012 |
| DE | 102011104256 A1 | 7/2012 |
| DE | 102011101990 B3 | 10/2012 |
| DE | 102012005707 A1 | 10/2012 |
| DE | 202012010517 | 12/2012 |
| DE | 102011108440 A1 | 1/2013 |
| DE | 102011120814 A1 | 6/2013 |
| DE | 102012006206 A1 | 10/2013 |
| DE | 102012206133 A1 | 10/2013 |
| DE | 102012019234 A1 | 4/2014 |
| DE | 102013000198 A1 | 7/2014 |
| EP | 0418653 A1 | 3/1991 |
| EP | 0433858 A2 | 6/1991 |
| EP | 1361543 A2 | 11/2003 |
| EP | 1593552 B1 | 3/2007 |
| EP | 1593552 B2 | 3/2007 |
| EP | 1810913 A1 | 7/2007 |
| EP | 2388180 A2 | 11/2011 |
| EP | 2452549 A1 | 5/2012 |
| EP | 2487454 A2 | 8/2012 |
| EP | 2551132 A1 | 1/2013 |
| EP | 2644477 A1 | 10/2013 |
| EP | 2803944 A2 | 11/2014 |
| FR | 2515379 A1 | 4/1983 |
| GB | 2265587 A | 10/1993 |
| GB | 2342630 A | 4/2000 |
| GB | 2398048 A | 8/2004 |
| GB | 2398049 A | 8/2004 |
| GB | 2398050 A | 8/2004 |
| JP | 61006458 | 1/1986 |
| JP | 6159491 A | 3/1986 |
| JP | 6385568 U | 6/1988 |
| JP | 01095980 A | 4/1989 |
| JP | 01095981 A | 4/1989 |
| JP | 09267762 A | 10/1997 |
| JP | 09328078 A | 12/1997 |
| JP | 10001063 A | 1/1998 |
| JP | 11124051 A | 5/1999 |
| JP | 11278319 A | 10/1999 |
| JP | 2002012172 A | 1/2002 |
| JP | 2002068032 A | 3/2002 |
| JP | 2003034261 A | 2/2003 |
| JP | 2003148938 A | 5/2003 |
| JP | 3716722 B2 | 11/2005 |
| JP | 2008027138 A | 2/2008 |
| JP | 2012105158 A | 5/2012 |
| JP | 2012166647 A | 9/2012 |
| JP | 2014002056 A | 1/2014 |
| WO | 8503263 A1 | 8/1985 |
| WO | 0044605 A1 | 8/2000 |
| WO | 2005005200 A2 | 1/2005 |
| WO | 2005116688 A2 | 12/2005 |
| WO | 2006042665 A1 | 4/2006 |
| WO | 2012059207 A1 | 5/2012 |
| WO | 2012103193 A1 | 8/2012 |
| WO | 2014019730 A1 | 2/2014 |
| WO | 2014037500 A1 | 3/2014 |

(56) References Cited

FOREIGN PATENT DOCUMENTS

| WO | 2014070047 A1 | 5/2014 |
|---|---|---|
| WO | 2014092611 A1 | 6/2014 |
| WO | 2014123575 A1 | 8/2014 |
| WO | 2015074027 A1 | 5/2015 |
| WO | 2015187467 A1 | 12/2015 |

OTHER PUBLICATIONS

Kristopher Bunker, "2012 Guide to Towing", Trailer Life, 2012, 38 pages.
A. Gonzalez-Cantos, "Backing-Up Maneuvers of Autonomous Tractor-Trailer Vehicles using the Qualitative Theory of Nonlinear Dynamical Systems," International Journal of Robotics Research, Jan. 2009, vol. 28, 1 page.
L. Chu, Y. Fang, M. Shang, J. Guo, F. Zhou, "Estimation of Articulation Angle for Tractor Semi-Trailer Based on State Observer", ACM Digital Library, ICMTMA '10 Proceedings of the 2010 International Conference on Measuring Technology and Automation, vol. 2, Mar. 2010, 1 page.
M. Wagner, D. Zoebel, and A. Meroth, "Adaptive Software and Systems Architecture for Driver Assistance Systems" International Journal of Machine Learning and Computing, Oct. 2011, vol. 1, No. 4, 7 pages.
F.W. Kienhöfer; D. Cebon, "An Investigation of ABS Strategies for Articulated Vehicles", Cambridge University, Engineering Department, United Kingdom, date unknown, 13 pages.
C. Lundquist; W. Reinelt; O. Enqvist, "Back Driving Assistant for Passenger Cars with Trailer", ZF Lenksysteme GmbH, Schwäbisch Gmünd, Germany, 2006 (SAE Int'l) Jan. 2006, 8 pages.
Zhe Leng; Minor, M., "A Simple Tractor-Trailer Backing Control Law for Path Following", IEEE, Intelligent Robots and Systems (IROS) IEEE/RSJ International Conference, Oct. 2010, 2 pages.
Kinjo, H.; Maeshiro, M.; Uezato, E.; Yamamoto, T., "Adaptive Genetic Algorithm Observer and its Application to Trailer Truck Control System", IEEE, SICE-ICASE International Joint Conference, Oct. 2006, 2 pgs.
J. Roh; H. Lee; W. Chung, "Control of a Car with a Trailer Using the Driver Assistance System", IEEE, International Conference on Robotics and Biomimetics; Phuket, Thailand, Dec. 2011, 6 pages.
A. Gonzalez-Cantos; J.I. Maza; A. Ollero, "Design of a Stable Backing Up Fuzzy Control of Autonomous Articulated Vehicles for Factory Automation", Dept. of Systems Engineering and Automatic Control, University of Seville, Spain, 2001, 5 pages.
Altafini, C.; Speranzon, A.; Wahlberg, B., "A Feedback Control Scheme for Reversing a Truck and Trailer Vehicle", IEEE, Robotics and Automation, IEEE Transactions, Dec. 2001, vol. 17, No. 6, 2 pages.
Zare, A. Sharafi; M. Kamyad, A.V., "A New Approach in Intelligent Trailer Parking", IEEE, 2010 2nd International Mechanical and Electrical Technology (ICMET), Sep. 2010, 1 page.
Tanaka, K.; Sano, M., "A Robust Stabilization Problem of Fuzzy Control Systems and its Application to Backing up Control of a Truck-trailer", IEEE Transactions on Fuzzy Systems, May 1994, vol. 2, No. 2, 1 page.
Sharafi, M. Zare; A. Kamyad; A.V. Nikpoor, S., "Intelligent Parking Method for Truck in Presence of Fixed and Moving Obstacles and Trailer in Presence of Fixed Obstacles: Advanced Fuzzy Logic Technologies in Industrial Applications", IEEE, 2010 International Electronics and Information Engineering (ICEIE), Aug. 2010, vol. 2, 1 page.
Hodo, D. W.; Hung, J.Y.; Bevly, D. M.; Millhouse, S., "Effects of Sensor Placement and Errors on Path Following Control of a Mobile Robot-Trailer System", IEEE, American Control Conference, Jul. 2007, 1 page.
Sharafi, M. Zare; A. Kamyad; A.V. Nikpoor, S., "Intelligent Parking Method for Trailers in Presence of Fixed and Moving Obstacles", IEEE, 2010 3rd International Conference on Advanced Computer Theory and Engineering (ICACTE), Aug. 2010, vol. 6, 1 page.

Chieh Chen; Tomizuka, M., "Steering and Independent Braking Control for Tractor-Semitrailer Vehicles in Automated Highway Systems", IEEE, Proceedings of the 34th IEEE Conference on Decision and Control, Dec. 1995, vol. 2, 1 page
P. Bolzern, R.M. Desantis, A. Locatelli, "An Input-Output Linearization Approach to the Control of an n-Body Articulated Vehicle", J. Dyn. Sys., Meas., Control, Sep. 2001, vol. 123, No. 3, 3 pages.
Dieter Zöbel, David Polock, Philipp Wojke, "Steering Assistance for Backing Up Articulated Vehicles", Systemics, Cybernetics and Informatics; vol. 1, No. 5, date unknown, 6 pages.
J.R. Billing; J.D. Patten; R.B. Madill, "Development of Configurations for Infrastructure-Friendly Five- and Six-Axle SemiTrailers", National Research Council of Canada and Ontario Ministry of Transportation, date unknown, 11 pages.
Jesus Morales, Anthony Mandow, Jorge L. Martinez, and Alfonso Garcia-Cerezo, "Driver Assistance System for Backward Maneuvers in Passive Multi-Trailer Vehicles", IEEE/RSJ International Conference on Intelligent Robots and Systems (IROS), Oct. 2012, 7 pages.
Cedric Pradalier and Kane Usher, "Experiments in Autonomous Reversing of a Tractor-Trailer System", 6th International Conference on Field and Service Robotics, inra-00195700, Version 1, Dec. 2007, 10 pages.
Andri Riid, Alar Leibak, Ennu Rüstern, "Fuzzy Backing Control of Truck and Two Trailers", Tallinn University of Technology; Tallinn, Estonia, date unknown, 6 pages.
Jane McGrath, "How to Avoid Jackknifing", A Discovery Company, date unknown, 3 pages.
Claudio Altafini, Alberto Speranzon, and Karl Henrik Johansson, "Hybrid Control of a Truck and Trailer Vehicle", Springer-Verlag Berlin Heidelberg, HSCC 2002, LNCS 2289; 2002, 14 pages.
Jujnovich, B.; Roebuck, R.; Odhams, A.; David, C., "Implementation of Active Rear Steering of a Tractor Semitrailer", Cambridge University, Engineering Department; Cambridge, United Kingdom, date unknown, 10 pages.
A.M.C. Odhams; R.L. Roebuck; C. Cebon, "Implementation of Active Steering on a Multiple Trailer Long Combination Vehicle", Cambridge University, Engineering Department; Cambridge, United Kingdom, date unknown, 13 pages.
Cedric Pradalier and Kane Usher, "Robust Trajectory Tracking for a Reversing Tractor-Trailer System", (Draft), Field and Service Robotics Conference, CSIRO ICT Centre, Jul. 2007, 16 pages.
Stahn, R.; Heiserich, G.; Stopp, A., "Laser Scanner-Based Navigation for Commercial Vehicles", IEEE, 2007 IEEE Intelligent Vehicles Symposium, Jun. 2007, 1 page.
Lee Yong H.; Weiwen Deng; Chin Yuen-Kwok Steve; McKay Neil, "Feasibility Study for a Vehicle-Trailer Backing Up Control", Refdoc.fr, SAE Transactions, vol. 113, No. 6, 2004, 1 page.
A.M.C. Odhams; R.L. Roebuck; B.A. Jujnovich; D. Cebon, "Active Steering of a Tractor-Semi-Trailer" Proceedings of the Institution of Mechanical Engineers, Part D: Journal of Automobile Engineering, SAGE Journals, vol. 225, No. 7, Jul. 2011, 1 page.
Haviland, G S, "Automatic Brake Control for Trucks—What Good Is It?", TRID, Society of Automotive Engineers, Sep. 1968, 1 page.
William E. Travis; David W. Hodo; David M. Bevly; John Y. Hung, "UGV Trailer Position Estimation Using a Dynamic Base RTK System", American Institute of Aeronautics and Astronautics, date unknown, 12 pages.
"VSE Electronic Trailer Steering", ETS for Trailers, version 2009, VSE Trailer Systems B.V., 2009, 28 pages.
"Telematics Past, Present, and Future," Automotive Service Association, www.ASAshop.org, May 2008, 20 pages.
"Fully Automatic Trailer Tow Hitch With LIN Bus," https://webista.bmw.com/webista/show?id=1860575499&lang=engb&print=1, date unknown, 5 pages.
"VBOX Yaw Rate Sensor With Integral Accelerometers," Racelogic, www.racelogicco.uk, date unknown, 2 pages.
P.D.C.R Jayarathna; J.V Wijayakulasooriya; S.R Kodituwakku, "Fuzzy Logic and Neural Network Control Systems for Backing up a Truck and a Trailer", International Journal of Latest Trends in Computing, vol. 2, No. 3, Sep. 2011, 8 pages.
Olof Enqvist, "AFS-Assisted Trailer Reversing," Institutionen för systemteknik Deartment of Electrical Engineering, Jan. 27, 2006, 57 pages.

(56) References Cited

OTHER PUBLICATIONS

Tofel, Kevin C., "How to measure anything with a camera and software", Feb. 6, 2007, 6 pgs. [Retrieved from http://giaom.com/2007/06/how_to_measure/ on Sep. 4, 2014].

Novak, Domen; Dovzan, Dejan; Grebensek, Rok; Oblak, Simon, "Automated Parking System for a Truck and Trailer", International Conference on Advances in the Internet, Processing, Systems and Interdisciplinary Research, Florence, 2007, WorldCat.org, 13 pgs.

Sonnenberg, Jan, "Service and User Interface Transfer from Nomadic Devices to Car Infotainment Systems", Second International Conference on Automotive User Interfaces and Interactive Vehicular Applications (Automotive UI), Nov. 11-12, 2010, pp. 162-165.

Ratajczak, Robert; Grajek, Tomasz; Wegner, Krzysztof; Klimaszewski, Krzusztof; Kurc, Maciej; Domański, Marek, "Vehicle Dimensions Estimation Scheme Using AAM on Sterescopic Video", date unknown, pp. 4321-4325.

"Measure and Calculate Distance", Help Forum, Google Maps, 1 pg. [Retrieved from https://support.google.com/maps/answer/1628031?hl=en on Sep. 4, 2014].

De Brito, Jr., Jailson A.; De Campos, Luis Edmundo Prado; "Automatic Vehicle Classification Using Learning-based Computer Vision and Fuzzy Logic", Departmento de Ciencia da Computacao, Instituto de Matematics, Universidade Federal da Bahia, date unknown, 4 pgs.

Dlagnekov, Louka; Belongie, Serge, "Recognizing Cars", Department of Computer Science and Engineering, University of California, San Diego, CA, date unknown, pp. 1-8.

SH. Azadi, H.R. Rezaei Nedamani, and R. Kazemi, "Automatic Parking of an Articulated Vehicle Using ANFIS", Global Journal of Science, Engineering and Technology (ISSN: 2322-2441), 2013, pp. 93-104, Issue No. 14.

F. Cuesta and A. Ollero, "Intelligent System for Parallel Parking of Cars and Tractor-Trailers", Intelligent Mobile Robot Navigation, STAR, 2005, pp. 159-188, Springer-Verlag Berlin Heidelberg.

Olof Enqvist, "AFS-Assisted Trailer Reversing," Institutionen för systemteknik Deartment of Electrical Engineering, Jan. 27, 2006, pp. 1-57.

\* cited by examiner

TRAILER BACKUP ASSIST SYSTEM WITH HITCH ANGLE OFFSET ESTIMATION

CROSS-REFERENCE TO RELATED APPLICATION

This application claims benefit from U.S. Provisional Patent Application No. 62/243,403, which was filed on Oct. 19, 2015, entitled "TRAILER BACKUP ASSIST SYSTEM WITH HITCH ANGLE OFFSET ESTIMATION," the entire disclosure of which is hereby incorporated herein by reference.

FIELD OF THE INVENTION

The present invention generally relates to driver assist technology, and more particularly to trailer backup assist systems.

BACKGROUND OF THE INVENTION

Reversing a vehicle while towing a trailer can be challenging for many drivers, particularly for drivers who drive with a trailer on an infrequent basis or with various types of trailers. Some systems used to assist a driver in backing a trailer rely on hitch angle measurements to determine the position of the trailer relative to the vehicle. Thus, the accuracy and reliability of the hitch angle measurements can be critical to the operation of the backup assist system.

SUMMARY OF THE INVENTION

According to one aspect of the present invention, a system for estimating hitch angle offset is provided. A sensor system is configured to measure hitch angles between a vehicle and a trailer attached thereto. A controller is configured to calculate hitch angle offsets for a plurality of measured hitch angles, and extrapolate additional hitch angle offsets based on the calculated hitch angle offsets.

According to another aspect of the present invention, a system for estimating hitch angle offset is provided. A sensor system is configured to measure hitch angles between a vehicle and a trailer attached thereto. A controller is configured to calculate hitch angle offsets for a plurality of measured hitch angles when a yaw rate of the vehicle and the trailer are substantially equal and constant, and extrapolate additional offsets based on the calculated hitch angle offsets.

According to yet another aspect of the present invention, a method for estimating hitch angle offset is provided and includes the steps of measuring hitch angles between a vehicle and a trailer attached thereto, calculating hitch angle offsets for the measured hitch angles, and extrapolating additional hitch angle offsets based on the calculated hitch angle offsets.

These and other features, advantages, and objects of the present invention will be further understood and appreciated by those skilled in the art by reference to the following specification, claims, and appended drawings.

DETAILED DESCRIPTION OF THE PREFERRED EMBODIMENTS

For purposes of description herein, it is to be understood that the disclosed trailer backup assist system and the related methods may assume various alternative embodiments and orientations, except where expressly specified to the contrary. It is also to be understood that the specific devices and processes illustrated in the attached drawings, and described in the following specification, are simply exemplary embodiments of the inventive concepts defined in the appended claims. While various aspects of the trailer backup assist system and the related methods are described with reference to a particular illustrative embodiment, the disclosed invention is not limited to such embodiments, and additional modifications, applications, and embodiments may be implemented without departing from the disclosed invention. Hence, specific dimensions and other physical characteristics relating to the embodiments disclosed herein are not to be considered as limiting, unless the claims expressly state otherwise.

As used herein, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination.

Figure 1:
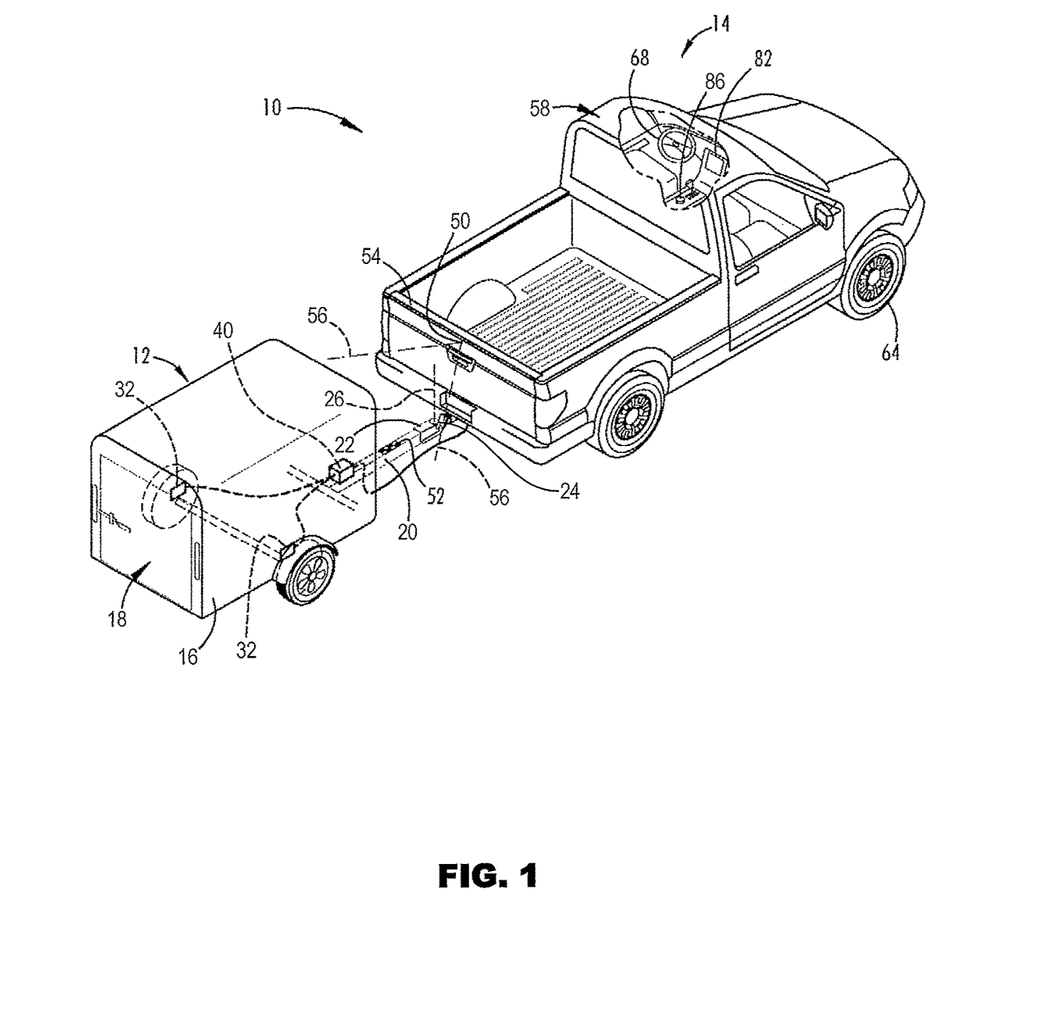
FIG. 1 is a top perspective view of a vehicle attached to a trailer with one embodiment of a hitch angle sensor for operating a trailer backup assist system.
Figure 2:
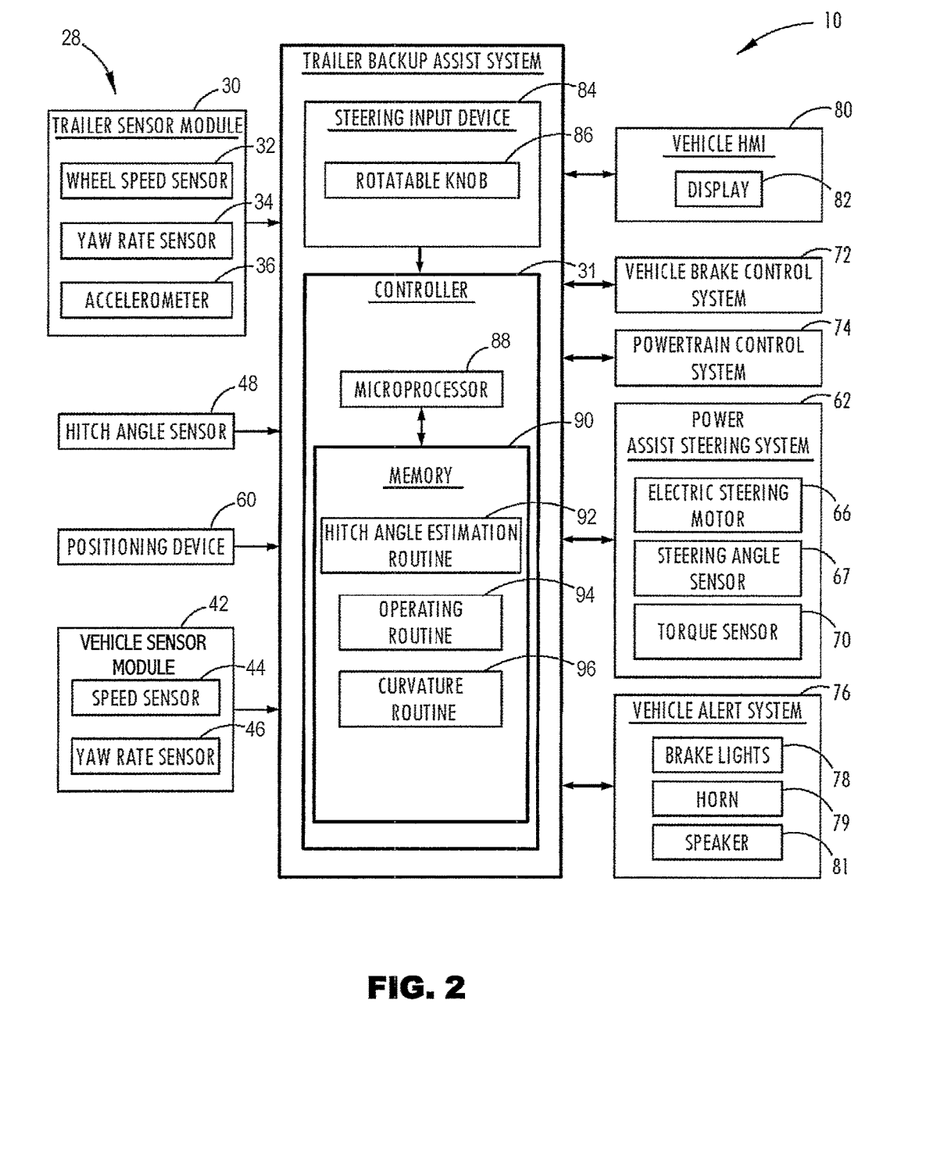
FIG. 2 is a block diagram illustrating one embodiment of the trailer backup assist system having a steering input device, a curvature controller, and a trailer braking system.
Figure 3:
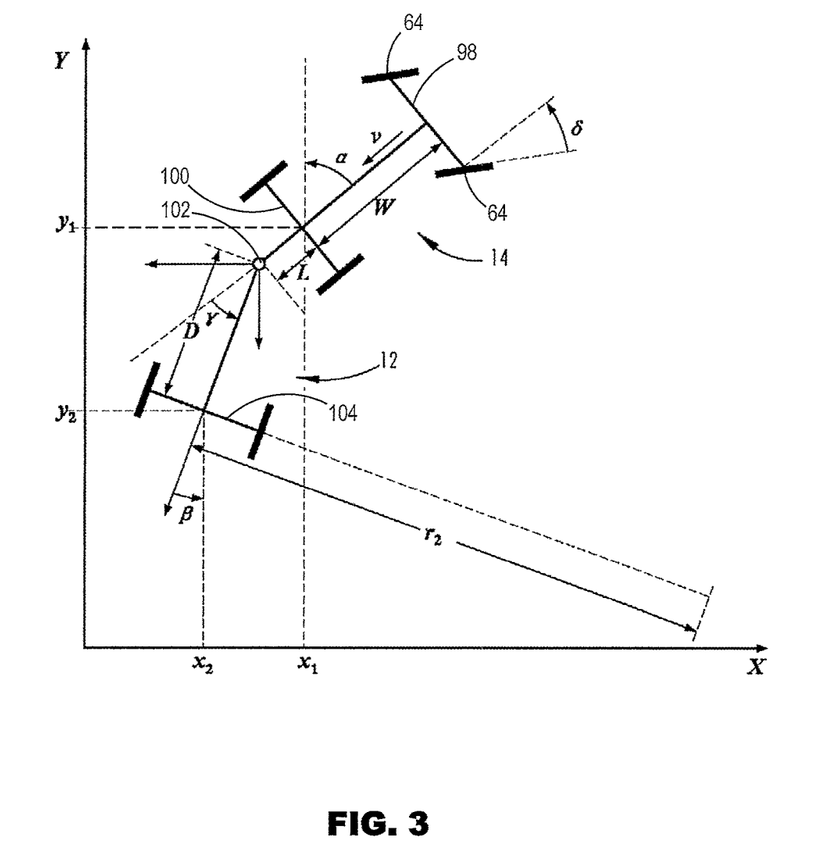
FIG. 3 is a schematic diagram that illustrates the geometry of a vehicle and a trailer overlaid with a two-dimensional x-y coordinate system, identifying variables used to determine a kinematic relationship of the vehicle and the trailer for the trailer backup assist system, according to one embodiment.

Referring to FIGS. 1 and 2, reference numeral 10 generally designates a trailer backup assist system for controlling a backing path of a trailer 12 attached to a vehicle 14 by allowing a driver of the vehicle 14 to specify a desired curvature of the backing path of the trailer 12. The vehicle 14 may be embodied as a pickup truck that is pivotally attached to one embodiment of the trailer 12 that has a box frame 16 with an enclosed cargo area 18, a single axle having a right wheel assembly and a left wheel assembly, and a tongue 20 longitudinally extending forward from the enclosed cargo area 18. The illustrated trailer 12 also has a trailer hitch connector in the form of a coupler assembly 22 that is connected to a vehicle hitch connector in the form of a hitch ball 24. The coupler assembly 22 latches onto the hitch ball 24 to provide a pivoting ball joint connection 26 that allows for articulation of a hitch angle (see hitch angle γ; FIG. 3) between the vehicle 14 and the trailer 12. It should be appreciated that additional embodiments of the trailer 12 may alternatively couple with the vehicle 14 to provide a pivoting connection, such as by connecting with a fifth wheel connector. It is also contemplated that additional embodiments of the trailer 12 may include more than one axle and may have various shapes and sizes configured for different loads and items, such as a boat trailer or a flatbed trailer.

To monitor the position of the trailer 12 relative to the vehicle 14, the trailer backup assist system 10 may include a sensor system 28 that senses or otherwise measures the hitch angle between the trailer 12 and the vehicle 14. In one embodiment, the sensor system 28 includes a trailer sensor module 30 that monitors certain dynamics of the trailer 12. The trailer sensor module 30 may generate a plurality of signals that are communicated to a controller 31 of the trailer backup assist system 10 and may include a wheel speed signal generated by a wheel speed sensor 32, a trailer yaw rate signal generated by a yaw rate sensor 34, and a lateral acceleration signal generated by an accelerometer 36. It is contemplated that the signals generated by the wheel speed sensor 32, the yaw rate sensor 34, and the accelerometer 36 may be compensated and filtered to remove offsets or drifts, and smooth out noise.

As shown in FIG. 1, one embodiment of the trailer sensor module 30 includes a housed sensor cluster 40 mounted on the tongue 20 of the trailer 12 proximate the enclosed cargo area 18 and includes left and right wheel speed sensors 32 on laterally opposing wheels of the trailer 12. It is conceivable that the wheel speed sensors 32 may be bi-directional wheel speed sensors for monitoring both forward and reverse speeds. Also, it is contemplated that the housed sensor cluster 40, in additional embodiments, may be mounted on alternative portions of the trailer 12. With respect to the illustrated embodiment, the yaw rate sensor 34 and the accelerometer 36 are contained within the housed sensor cluster 40, although other configurations are conceivable. In alternative embodiments, the accelerometer 36 may be two or more separate sensors and may be arranged at an offset angle, such as two sensors arranged at plus and minus forty-five degrees from the longitudinal direction of the trailer 12 or arranged parallel with the longitudinal and lateral directions of the trailer 12, to generate a more robust acceleration signal.

In addition to the trailer sensor module 30, the trailer backup assist system 10 may also include a vehicle sensor module 42 that may be variously located on the vehicle 14 and monitors certain dynamics of the vehicle 14. The vehicle sensor module 42 may generate a plurality of signals that are communicated to the controller 31 and may include a vehicle speed signal generated by a speed sensor 44 and a vehicle yaw rate signal generated by a yaw rate sensor 46. Based on signals received from the trailer sensor module 30 and the vehicle sensor module 42, the controller 31 of the trailer backup assist system 10 may determine the hitch angle between the vehicle 14 and the trailer 12. For example, the hitch angle may be determined based on a trailer yaw rate, a vehicle yaw rate, and a vehicle speed in view of a kinematic relationship, as will be described further herein, between the trailer 12 and the vehicle 14.

In another embodiment, the sensor system 28 may additionally or alternatively include a hitch angle sensor 48, which may be embodied as a camera 50 located at the rear of the vehicle 14 to monitor at least one target 52 on the trailer 12 to determine the hitch angle. The camera 50 may be located proximate an upper region of a vehicle tailgate 54 such that the camera 50 is elevated relative to the tongue 20 of the trailer 12. The camera 50 has a field of view 56 located and oriented to capture one or more images of the trailer 12, including a region in which the target 52 is secured to the trailer 12. In practice, the target 52 is placed on the trailer 12 to allow the trailer backup assist system 10 to utilize information acquired via image acquisition and processing of the target 52. For instance, the camera 50 may include a video imaging camera that repeatedly captures successive images of the trailer 12 that may be processed to identify the target 52 and its location on the trailer 12 for determining movement of the target 52 and the trailer 12 relative to the vehicle 14 and the corresponding hitch angle. It should also be appreciated that the camera 50 may include one or more video imaging cameras and may be located at other locations on the vehicle 14 to acquire images of the trailer 12 and the target 52, such as on the passenger cab 58 of the vehicle 14 to capture images of a gooseneck trailer.

With reference to the embodiment of the trailer backup assist system 10 shown in FIG. 2, the trailer backup assist system 10 may receive vehicle and trailer related information from additional sensors and devices. The additional sensors and devices may be used to supplement the sensor system 28 and may include a positioning device 60, such as a global positioning system (GPS) on the vehicle 14 or a hand held device, to determine a coordinate location of the vehicle 14 and the trailer 12 based on the location of the positioning device 60 with respect to the trailer 12 and/or the vehicle 14 and based on the measured hitch angle. The positioning device 60 may additionally or alternatively include a dead reckoning system for determining the coordinate location of the vehicle 14 and the trailer 12 within a localized coordinate system based at least on vehicle speed, steering angle, and hitch angle.

As is further shown in FIG. 2, one embodiment of the trailer backup assist system 10 is in communication with a power assist steering system 62 of the vehicle 14 to operate the steered wheels 64 (FIG. 1) of the vehicle 14 for moving the vehicle 14 in such a manner that the trailer 12 reacts in accordance with the desired curvature of the backing path of the trailer 12. In the illustrated embodiment, the power assist steering system 62 is an electric power-assisted steering (EPAS) system that includes an electric steering motor 66 for turning the steered wheels 64 to a steering angle (see steering angle δ; FIG. 3) based on a steering command generated by the controller 31, whereby the steering angle δ may be sensed by a steering angle sensor 67 of the power assist steering system 62 and provided to the controller 31. The steering command may be provided for autonomously steering the vehicle 14 during a backup maneuver and may alternatively be provided manually via a rotational position (e.g., a steering wheel angle) of a steering wheel 68 (FIG. 1). However, in some embodiments, the steering wheel 68 of the vehicle 14 may be mechanically coupled with the steered wheels 64 of the vehicle 14, such that the steering wheel 68 moves in concert with the steered wheels 64 via an internal torque, thereby preventing manual intervention with the steering wheel 68 during autonomous steering of the vehicle 14. In such instances, the power assist steering system 62 may include a torque sensor 70 that senses torque (e.g., gripping and/or turning) on the steering wheel 68 that is not expected from autonomous control of the steering wheel 68 and therefore indicative of manual intervention by the driver. In some embodiments, external torque applied to the steering wheel 68 may serve as a signal to the controller 31 that the driver has taken manual control and for the trailer backup assist system 10 to discontinue autonomous steering functionality.

The trailer backup assist system 10 may also communicate with a vehicle brake control system 72 of the vehicle 14. In one embodiment, the vehicle brake control system 72 provides the controller 31 with vehicle speed information such as individual wheel speeds of the vehicle 14. Additionally or alternatively, vehicle information may be provided to the controller 31 by a powertrain control system 74, speed sensor 44, and/or the positioning device 60, among other conceivable means. It is also conceivable that individual wheel speeds may be used to determine a vehicle yaw rate, which can be provided to the controller 31 in the alternative, or in addition to, the vehicle yaw rate measured by yaw rate sensor 46 of the vehicle sensor module 42. In some embodiments, the controller 31 may provide braking commands to the vehicle brake control system 72, thereby allowing the trailer backup assist system 10 to regulate the speed of the vehicle 14 during a backup maneuver of the trailer 12. It should be appreciated that the trailer backup system 10 may additionally or alternatively regulate the speed of the vehicle 14 via interaction with the powertrain control system 74.

Through interaction with the power assist steering system 62, the vehicle brake control system 72, and/or the powertrain control system 74 of the vehicle 14, the potential for unacceptable trailer backup conditions can be reduced. Examples of unacceptable trailer backup conditions include, but are not limited to, a vehicle over-speed condition, a high hitch angle rate, an inability to track the target 52, hitch angle dynamic instability, a trailer jackknife condition, sensor failure, and the like. In such circumstances, the driver may be unaware of the failure until the unacceptable trailer backup condition is imminent or already happening. Therefore, it is disclosed herein that the trailer backup assist system 10 can generate an alert signal corresponding to a notification of an actual, impending, and/or anticipated unacceptable trailer backup condition, and prior to driver intervention, generate a counter measure to prevent such an unacceptable trailer backup condition, as further described herein.

According to the embodiment shown in FIG. 2, the trailer backup assist system 10 may communicate with one or more devices, including a vehicle alert system 76, which may prompt visual, auditory, and tactile warnings. For instance, vehicle brake lights 78 and vehicle emergency flashers may provide a visual alert and a vehicle horn 79 and/or speaker 81 may provide an audible alert. Additionally, the trailer backup assist system 10 and/or vehicle alert system 76 may communicate with a human machine interface (HMI) 80 of the vehicle 14. The HMI 80 may include a vehicle display 82, such as a center-stack mounted navigation or entertainment display (FIG. 1) capable of displaying images indicating the alert. Such an embodiment may be desirable to notify the driver of the vehicle 14 that a sensor and/or input device used by the backup assist system 10 has failed. Further, the trailer backup assist system 10 may communicate via wireless communication with another embodiment of the HMI 80, such as with one or more handheld or portable devices, including one or more smartphones. The portable device may also include the display 82 for displaying one or more images and other information to a user. For instance, the portable device may display an image indicating the sensor and/or input device that has failed. In addition, the portable device may provide feedback information, such as visual, audible, and tactile alerts.

With respect to the general operation of the trailer backup assist system 10, a steering input device 84 may be provided to enable a driver to control or otherwise modify the desired curvature of the backing path of the trailer 12. The steering input device 84 may be communicatively coupled to the controller 31 in a wired or wireless manner and provides the controller 31 with information defining the desired curvature of the backing path of the trailer 12. In response, the controller 31 processes the information and generates corresponding steering commands that are supplied to the power assist steering system 62 of the vehicle 14. In one embodiment, the steering input device 84 includes a rotatable knob 86 operable between a number of rotated positions that each provide an incremental change to the desired curvature of the backing path of the trailer 12.

With respect to the embodiments described herein, the controller 31 is configured with a microprocessor 88 and/or other analog and/or digital circuitry for processing one or more logic routines stored in a memory 90. The logic routines may include a hitch angle estimation routine 92, an operating routing 94, and a curvature routine 96 that receive information from the sensor system 28, the steering input device 84, the power assist steering system 62, the vehicle brake control system 72, the powertrain control system 74, and any other sensors or devices described herein. The controller 31 may generate commands (e.g., steering commands) as a function of all, or a portion of, the information received. The information can be supplied to the controller 31 via a communication network of the vehicle 14, which can include a controller area network (CAN), a local interconnect network (LIN), or other conventional protocols used in the automotive industry. It should be appreciated that the controller 31 may be a stand-alone dedicated controller or may be a shared controller integrated with other control functions, such as integrated with the sensor system 28, the power assist steering system 62, and other conceivable onboard or off-board vehicle control systems.

With reference to FIG. 3, we now turn to a discussion of vehicle and trailer information and parameters used to calculate a kinematic relationship between a desired curvature of a backing path of the trailer 12 and the steering angle of the vehicle 14 towing the trailer 12, which can be desirable for a trailer backup assist system 10 configured in accordance with some embodiments, including for use by the curvature routine 96 of the controller 31 in one embodiment. To achieve such a kinematic relationship, certain assumptions may be made with regard to parameters associated with the vehicle 14 and the trailer 12. Examples of such assumptions include, but are not limited to, the trailer 12 being backed by the vehicle 14 at a relatively low speed, wheels of the vehicle 14 and the trailer 12 having negligible slip, tires of the vehicle 14 having negligible lateral compliance, tires of the vehicle 14 and the trailer 12 having negligible deformation, actuator dynamics of the vehicle 14 being negligible, and the vehicle 14 and the trailer 12 exhibiting negligible roll or pitch motions, among other conceivable factors with the potential to have an effect on controlling the trailer 12 with the vehicle 14.

As shown in FIG. 3, the kinematic relationship is based on various parameters associated with the vehicle 14 and the trailer 12. These parameters include:

$\delta$: steering angle at steered wheels 64 of the vehicle 14;

$\alpha$: yaw angle of the vehicle 14;

$\beta$: yaw angle of the trailer 12;

$\gamma$: hitch angle between the vehicle 14 and the trailer 12 ($\gamma=\beta-\alpha$);

W: wheelbase length between a front axle 98 and a rear axle 100 of the vehicle 14;

L: drawbar length between a hitch point 102 and the rear axle 100 of the vehicle 14;

D: trailer length between the hitch point 102 and axle 104 of the trailer 12 or effective axle for a multiple axle trailer; and $r_2$: curvature radius for the trailer 12.

One embodiment of a kinematic relationship between curvature radius $r_2$ at the midpoint of axle 104 of the trailer 12, steering angle $\delta$ of the steered wheels 64 of the vehicle 14, and the hitch angle $\gamma$ can be expressed in the equation provided below. As such, if the hitch angle $\gamma$ is provided, the trailer path curvature $\kappa_2$ can be controlled based on regulating the steering angle $\delta$ (where $\dot{\beta}$ is trailer yaw rate and $\dot{\eta}$ is trailer velocity).

$$\kappa_2 = \frac{1}{r_2} = \frac{\dot{\beta}}{\dot{\eta}} = \frac{\left(W + \frac{Kv^2}{g}\right)\sin\gamma + L\cos\gamma\tan\delta}{D\left(\left(W + \frac{Kv^2}{g}\right)\cos\gamma - L\sin\gamma\tan\delta\right)}$$

This relationship can be expressed to provide the steering angle $\delta$ as a function of trailer path curvature $\kappa_2$ and hitch angle $\gamma$, as shown in by following steering angle equation:

$$\delta = \tan^{-1}\left(\frac{\left(W + \frac{Kv^2}{g}\right)[\kappa_2 D\cos\gamma - \sin\gamma]}{DL\kappa_2\sin\gamma + L\cos\gamma}\right) = F(\gamma, \kappa_2, K)$$

Accordingly, for a particular vehicle and trailer combination, certain parameters (e.g., D, W and L) of the kinematic relationship are constant and assumed known. v is the vehicle longitudinal speed and g is the acceleration due to gravity. K is a speed dependent parameter which when set to zero makes the calculation of steering angle independent of vehicle speed. For example, vehicle-specific parameters of the kinematic relationship can be predefined in an electronic control system of the vehicle 14 and trailer-specific parameters of the kinematic relationship can be inputted by a driver of the vehicle 14, determined from sensed trailer behavior in response to vehicle steering commands, or otherwise determined from signals provided by the trailer 12. Trailer path curvature $\kappa_2$ can be determined from input via the steering input device 84 or other user-input device (e.g., HMI 80). Through the use of the steering angle equation presented above for providing steering angle $\delta$, a corresponding steering command can be generated by the curvature routine 96 for controlling the power assist steering system 62 of the vehicle 14.

In an additional embodiment, an assumption may be made by the curvature routine 96 that the drawbar length L of the vehicle 14 is equal to zero for purposes of operating the trailer backup assist system 10 when a gooseneck trailer or other similar trailer is connected with a hitch ball or a fifth wheel connector located over a rear axle 100 of the vehicle 14. The assumption essentially assumes that the pivoting connection with the trailer 12 is substantially vertically aligned with the rear axle of the vehicle 14. When such an assumption is made, the controller 31 may generate the steering angle command for the vehicle 14 as a function independent of the drawbar length L of the vehicle 14. It is appreciated that the gooseneck trailer mentioned generally refers to the tongue configuration being elevated to attach with the vehicle 14 at an elevated location over the rear axle, such as within a bed of a truck, whereby embodiments of the gooseneck trailer may include flatbed cargo areas, enclosed cargo areas, campers, cattle trailers, horse trailers, lowboy trailers, and other conceivable trailers with such a tongue configuration.

Figure 4:
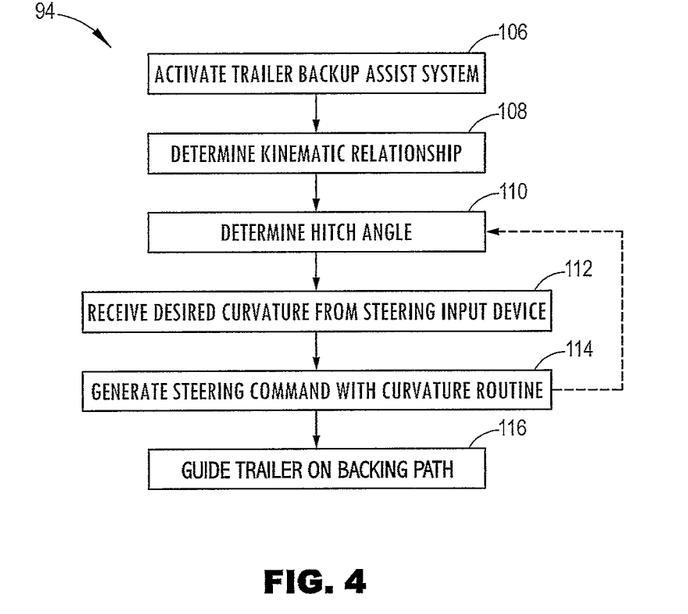
FIG. 4 is a flow diagram of a method of operating the trailer backup assist system, according to one embodiment.

With reference to FIG. 4, a method of operating the trailer backup assist system 10 is illustrated, shown as one embodiment of the operating routine 94 (FIG. 2). At step 106, the method is initiated by the trailer backup assist system 10 being activated. It is contemplated that this may be done in a variety of ways, such as making a selection on the display 82 of the HMI 80. At step 108, the trailer backup assist system 10 determines the kinematic relationship between the vehicle 14 and the trailer 12. To determine the kinematic relationship, various parameters of the vehicle 14 and the trailer 12 may be sensed, input by the driver, or otherwise determined for the trailer backup assist system 10. At step 110, the trailer backup assist system 10 determines a hitch angle between the vehicle 14 and the trailer 12. This may be done by processing the hitch angle estimation routine 92 (FIG. 2) based on information provided by the sensor system 28 or other systems described herein. At steps 112 and 114, the trailer backup assist system 10 may receive a desired curvature from the steering input device 84 and subsequently generate a corresponding steering command with the curvature routine 96 (FIG. 2) based at least in part on the information provided by the steering input device 84 and the hitch angle determined in step 110. Steps 110-114 may be repeated as the trailer backup assist system 10 guides the trailer 12 along the backing path at step 116.

Figure 5:
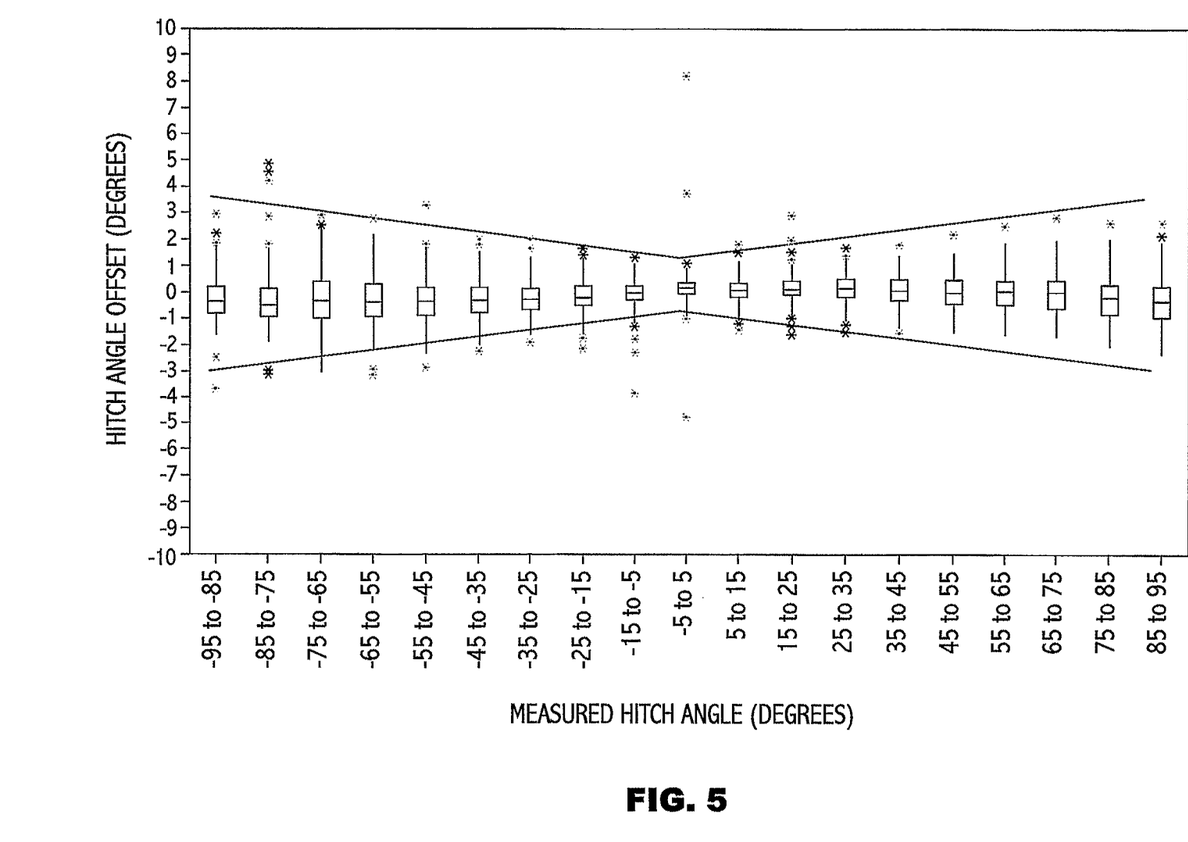
FIG. 5 is a graph illustrating measured hitch angles and corresponding hitch angle offsets.

Regarding the embodiments described herein, there may be instances when the hitch angle, as measured by the sensor system 28 for example, is accompanied by an offset that varies with the actual hitch angle between the vehicle 14 and the trailer 12. The offset may be caused by a variety of factors. For example, when using the camera 50 to monitor the target 52 to measure hitch angle, the error may be caused by the alignment of the lens and the imager of the camera 50 and/or the assumed position of the target 52. With this in mind, when the curvature routine 96 of the trailer backup assist system 10 fails to account for such offsets while generating steering commands that are used to control the power assist steering system 62 of the vehicle 14, the actual curvature achieved will be inconsistent with that desired by the driver of the vehicle 14. For exemplary purposes, a graph is shown in FIG. 5 illustrating various measured hitch angles and corresponding hitch angle offsets in degrees. From the graph, it can be seen that the hitch angle offsets generally worsen at higher measured hitch angles. In view of the above, the trailer backup assist system 10, according to one embodiment, may be configured to estimate hitch angle offsets and compensate for those errors in order to deliver a more consistent trailer backing experience.

With reference back to the kinematic relationship of the vehicle 14 and the trailer 12 shown in FIG. 3, when the hitch angle $\gamma$ and steering angle $\delta$ are substantially constant, the yaw rate of the vehicle 14 and the trailer 12 are also substantially constant and equal to one another. This interaction is used to formulate kinematic equations that can be solved for determining the hitch angle offset associated with a given measured hitch angle between the vehicle 14 and the trailer 12. Specifically, the yaw rate of the vehicle 14, which may be measured by yaw rate sensor 46 or steering angle sensor 67, for example, provides the following equation:

$$\frac{d\alpha}{dt} = -\frac{v}{W}\tan\delta$$

Furthermore, the yaw rate of the trailer 12, which may be measured by yaw rate sensor 34, for example, can be represented with the following equation:

$$\frac{d\beta}{dt} = \frac{v}{D}\sin\gamma + \frac{Lv}{DW}\cos\gamma\tan\delta$$

Where δ is the steering angle at steered wheels 64 of the vehicle 14; α is the yaw angle of the vehicle 14; β is the yaw angle of the trailer 12; γ is the hitch angle between the vehicle 14 and the trailer 12; W is the wheelbase length between the front axle 98 and the rear axle 100 of the vehicle 14; L is the drawbar length between the hitch point 102 and the rear axle 100 of the vehicle 14; v is the vehicle longitudinal speed; and D is the trailer length between the hitch point 102 and axle 104 of the trailer 12.

Accordingly, when the yaw rate of the vehicle 14 and the trailer 12 become equal, the hitch angle γ and the steering angle δ will be constant, and by extension, the measured hitch angle associated with the hitch angle γ will also be constant. This condition can occur when a steering command is maintained during a backing maneuver such as when a driver attempts to reverse the trailer 12 in a straight line with the vehicle 14 or when the driver inputs a constant desired curvature via the steering input device 84. Under such driving conditions, the resulting hitch angle γ can be described using the following equation:

$$c = a\cos\gamma + b\sin\gamma$$

This equation can be rewritten as follows:

$$c = a\sqrt{1-\sin^2\gamma} + b\sin\gamma$$

The above equation can be rearranged into quadratic form and rewritten as follows:

$$c^2 - a^2 - 2bc\sin\gamma + (b^2+a^2)\sin\gamma = 0$$

Solving the quadratic equation for the hitch angle γ yields the following hitch angle equation:

$$\gamma = \arcsin\frac{bc \pm a\sqrt{b^2+a^2-c^2}}{b^2+a^2}$$

The hitch angle γ is defined by a corresponding measured hitch angle $\gamma_m$ plus a hitch angle offset $\gamma_o$, thereby allowing the hitch angle equation to be rearranged into the following hitch angle offset equation:

$$\gamma_o = \arcsin\frac{bc \pm a\sqrt{b^2+a^2-c^2}}{b^2+a^2} - \gamma_m$$

Where, $$c = -\frac{1}{W}\tan\delta$$

$$b = \frac{1}{D}$$

$$a = \frac{L}{DW}\tan\delta$$

Accordingly, the hitch angle offset $\gamma_o$ may be calculated using the hitch angle offset equation as a function of the trailer length D, the wheelbase length W, the drawbar length L, and the steering angle δ while meeting the conditions provided above to use said equation. Specifically, the conditions may generally include that the vehicle 14 and trailer 12 are engaged in either a forward or backing maneuver and that the measured hitch angle $\gamma_m$ and the steering angle δ are substantially constant during the maneuver for at least a threshold period of time or over a threshold distance of motion.

Figure 6:
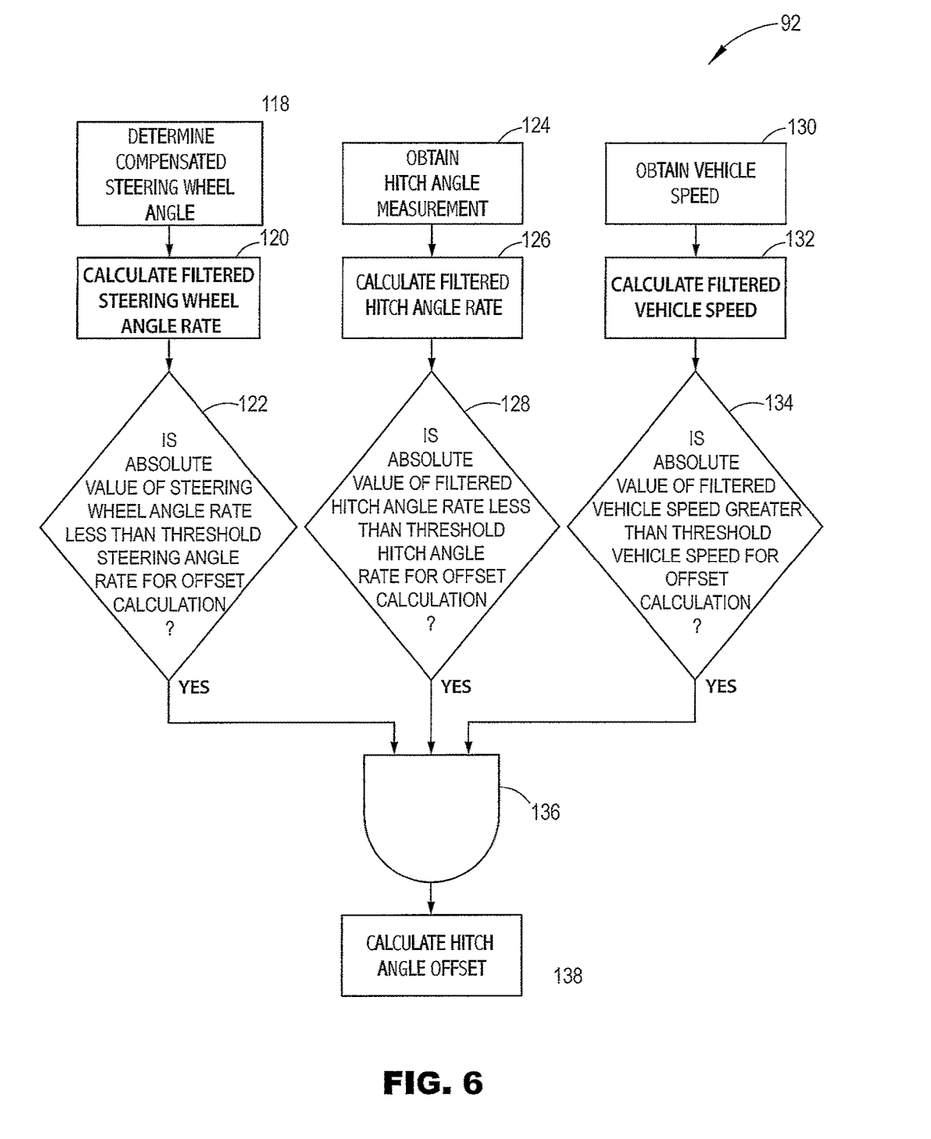
FIG. 6 is a flow diagram illustrating a method of calculating hitch angle offset, according to one embodiment.

Referring to FIG. 6, a method of calculating hitch angle offset is illustrated, shown as one embodiment of the hitch angle estimation routine 92 (FIG. 2). The method enables one or more hitch angle offsets to be calculated and may be performed while the vehicle 14 and trailer 12 are engaged in either a forward or backing maneuver. As shown in FIG. 6, the method includes determining a steering wheel angle at step 118. The steering wheel angle may be provided by steering angle sensor 67 and may be compensated to remove any offsets associated therewith. Next, at step 120, a steering wheel angle rate is calculated and is filtered to remove noise. At step 122, it is determined whether an absolute value of the filtered steering wheel angle rate is less than a threshold steering angle rate for an offset calculation. The method also includes obtaining a measured hitch angle (e.g., from the sensor system 28) at step 124, calculating a filtered hitch angle rate at step 126, and then determining at step 128 whether an absolute value of the filtered hitch angle rate is less than a threshold hitch angle rate for the offset calculation. The method further includes obtaining a vehicle speed (e.g., from speed sensor 44) at step 130, calculating a filtered vehicle speed at step 132, and then determining at step 134 whether an absolute value of the filtered vehicle speed is greater than a threshold vehicle speed for the offset calculation. If the conditions specified at steps 122, 128, and 134 are met at step 136, a hitch angle offset is calculated at step 138 pursuant to the hitch angle offset equation described herein.

Figure 7:
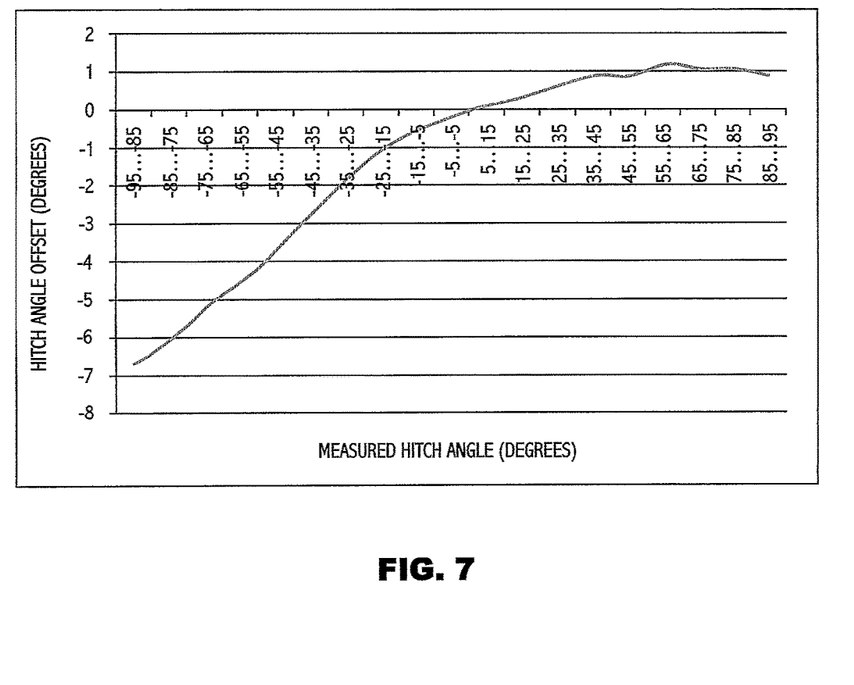
FIG. 7 is a graph demonstrating a curve fit between a range of measured hitch angles and their corresponding hitch angle offsets.

Over the course of one or more backing maneuvers, it is possible for the conditions specified at steps 122, 128, and 134 to be satisfied with respect to various measured hitch angles, thereby allowing the trailer backup assist system 10 to determine a number of corresponding hitch angle offsets for a particular trailer. Advantageously, the calculated hitch angle offsets may be extrapolated to deduce additional hitch angle offsets. In one embodiment, the controller 31 may perform a curve fit between the calculated hitch angle offsets in order to estimate additional hitch angle offsets related to measurable hitch angles falling within the operating range of the trailer backup assist system 10. For exemplary purposes, a graph is shown in FIG. 7 illustrating a curve fit between a range of measured hitch angles and their corresponding hitch angle offsets in degrees. It is contemplated that the curve fit may be a linear function or some other higher order function. The curve fit generated by the controller 31 may be stored to its memory 90 and called upon when engaging in trailer backup features with respect to the particular trailer. For instance, the appropriate hitch angle offsets can be provided to the curvature routine 96 when generating steering commands for controlling the power assist steering system 62 of the vehicle 14. More specifically, measured hitch angles may be added to their corresponding hitch angle offsets to yield the hitch angle values used in the steering angle equation described herein previously, thereby enabling more precise steering commands to be generated by the curvature routine 96 for controlling the power assist steering system 62 of the vehicle 14. By accounting for hitch angle offset, the actual curvature of the backing path of the trailer 12 will better reflect the intent of the driver, thus providing the driver with a consistent driving experience.

It is to be understood that variations and modifications can be made on the aforementioned structures and methods without departing from the concepts of the present invention, and further it is to be understood that such concepts are intended to be covered by the following claims unless these claims by their language expressly state otherwise.

The invention claimed is:

1. A system for estimating hitch angle offset comprising:
 a sensor system configured to measure hitch angles between a vehicle and a trailer attached thereto; and
 a controller configured to:
  calculate hitch angle offsets for a plurality of measured hitch angles;
  extrapolate additional hitch angle offsets based on the calculated hitch angle offsets; and
  assist with guiding the vehicle to reverse the trailer on a backing path based on the extrapolated additional hitch angle offsets.

2. The system of claim 1, wherein the sensor system comprises a camera of the vehicle that monitors a target on the trailer.

3. The system of claim 1, wherein each of the hitch angle offsets are calculated when a corresponding measured hitch angle is substantially constant.

4. The system of claim 1, wherein each of the hitch angle offsets are calculated as a function of a trailer length, a wheelbase length, a drawbar length, and a steering angle.

5. The system of claim 1, wherein each of the hitch angle offsets are calculated when a yaw rate of the vehicle and the trailer are substantially equal and constant.

6. The system of claim 1, wherein the controller performs a curve fit between the calculated hitch angle offsets to estimate the additional hitch angle offsets, the additional hitch angle offsets being related to measurable hitch angles for operating a trailer backup assist system.

7. The system of claim 6, wherein the curve fit is one of a linear function and a higher order function.

8. A system for estimating hitch angle offset comprising:
 a sensor system configured to measure hitch angles between a vehicle and a trailer attached thereto; and
 a controller configured to:
  calculate hitch angle offsets for a plurality of measured hitch angles when a yaw rate of the vehicle and the trailer are substantially equal and constant;
  extrapolate additional hitch angle offsets based on the calculated hitch angle offsets; and
  assist with guiding the vehicle to reverse the trailer on a backing path based on the extrapolated additional hitch angle offsets.

9. The system of claim 8, wherein the sensor system comprises a camera of the vehicle that monitors a target on the trailer.

10. The system of claim 8, wherein each of the hitch angle offsets are calculated when a corresponding measured hitch angle is substantially constant.

11. The system of claim 8, wherein each of the hitch angle offsets are calculated as a function of a trailer length, a wheelbase length, a drawbar length, and a steering angle.

12. The system of claim 8, wherein the controller performs a curve fit between the calculated hitch angle offsets to estimate the additional hitch angle offsets, the additional hitch angle offsets being related to measurable hitch angles for operating a trailer backup assist system.

13. The system of claim 12, wherein the curve fit is one of a linear function and a higher order function.

14. A method for estimating hitch angle offset comprising the steps of:
 measuring hitch angles between a vehicle and a trailer attached thereto;
 calculating hitch angle offsets for the measured hitch angles;
 extrapolating additional hitch angle offsets based on the calculated hitch angle offsets; and
 assisting with guiding the vehicle to reverse the trailer on a backing path based on the extrapolated additional hitch angle offsets.

15. The method of claim 14, wherein the hitch angles are measured by a camera of the vehicle that monitors a target on the trailer.

16. The method of claim 14, wherein each of the hitch angle offsets are calculated when a corresponding measured hitch angle is substantially constant.

17. The method of claim 14, wherein each of the hitch angle offsets are calculated as a function of a trailer length, a wheelbase length, a drawbar length, and a steering angle.

18. The method of claim 14, wherein each of the hitch angle offsets are calculated when a yaw rate of the vehicle and the trailer are substantially equal and constant.

19. The method of claim 14, wherein the step of extrapolating comprises performing a curve fit between the calculated hitch angle offsets to estimate the additional hitch angle offsets, the additional hitch angle offsets being related to measurable hitch angles for operating a trailer backup assist system.

20. The method of claim 19, wherein the curve fit is one of a linear function and a higher order function.

* * * * *